United States Patent [19]
Takeda et al.

[11] 3,963,821
[45] June 15, 1976

[54] METHOD FOR PRODUCING SYNTHETIC FIBER FOR PAPER

[75] Inventors: Hiromu Takeda; Takuichi Kobayashi; Koichiro Oka, all of Otsu; Kazumi Tanaka, Kusatsu, all of Japan

[73] Assignee: Toray Industries, Inc., Tokyo, Japan

[22] Filed: Nov. 4, 1974

[21] Appl. No.: 520,538

Related U.S. Application Data

[62] Division of Ser. No. 488,486, July 15, 1974.

[30] Foreign Application Priority Data
July 19, 1973 Japan............... 48-80469
July 26, 1973 Japan............... 48-83609
Aug. 2, 1973 Japan............... 48-86384

[52] U.S. Cl. ............ 264/147; 162/157 R; 260/876 R; 264/151; 264/182; 264/185
[51] Int. Cl.²............ B29H 7/18
[58] Field of Search............ 260/898, 876 R, 881, 260/886; 264/182, 185, 184, 147, 151; 162/157

[56] References Cited
UNITED STATES PATENTS

| | | | |
|---|---|---|---|
| 2,840,447 | 6/1958 | Green | 264/182 |
| 2,874,023 | 2/1959 | Walter | 260/898 |
| 2,938,008 | 5/1960 | Hare | 260/898 |
| 3,097,991 | 7/1963 | Miller et al. | 162/157 |
| 3,133,135 | 5/1964 | Ogle | 260/898 |
| 3,242,120 | 3/1966 | Skulen | 260/898 |

*Primary Examiner*—Jay H. Woo

[57] ABSTRACT

Method for producing a synthetic fiber substantially comprising dissolving a composition consisting essentially of:
A. 5–40 percent by weight of a copolymer consisting of
  a. 20–80 percent by weight of polyvinyl alcohol, and
  b. 80–20 percent by weight of acrylonitrile, and
B. 60–95 percent by weight of a copolymer consisting of
  c. 55–95 percent by weight of styrene, and
  d. 5–45 percent by weight of acrylonitrile, in dimethyl sulfoxide or dimethyl acetamide as a solvent, and wet-spinning This fiber is used for producing paper and has a potentially fibrillar texture. When beaten, it forms a synthetic pulp having stalk fibrils and micro fibrils extending from the stalk fibrils.

High-tenacity synthetic paper can be made because this synthetic pulp is self-adhesive.

5 Claims, 2 Drawing Figures

PULP FREENESS v. DEGREE OF BEATING

PULP FREENESS v. DEGREE OF BEATING

METHOD FOR PRODUCING SYNTHETIC FIBER FOR PAPER

This is a division of application Ser. No. 488,486 filed July 15, 1974.

SUMMARY OF THE INVENTION

The present invention relates to a method for producing a synthetic fiber. a method for producing Heretofore, many proposals have been made for the manufacture of synthetic paper consisting of synthetic fibers instead of paper made from natural pulp, by utilizing the physically or chemically superior properties of synthetic fibers.

BACKGROUND OF THE INVENTION

Heretofore, various proposals have been made with reference to a method for producing synthetic pulp from synthetic fibers.

As methods using a polymer of the acrylic series, known methods include making the polymer a porous gel fiber and then beating the said fiber, treating the polymer with a liquid agent such as strong mineral acid, a swelling agent, a determining agent, and promoting fibrillation by polymer blending. Methods using a polymer of the olefin series, include splitting a film to bring about fibrillation. However, because by such means the resulting pulp does not acquire hydrophilic properties, satisfactory dispersing properties in water at the time of wet paper making, and satisfactory adhesion of fibrils after the sheet is formed, have not been obtained.

On the other hand, from the viewpoint of performance of the paper, synthetic pulps have not been known which are capable of producing a paper having a high degree of opacity and having high wet dimensional stability. As materials for improving such characteristics of wood pulp, various inorganic fillers or powdered synthetic polymers have been used. However, they have no paperforming capability and can be used only as additives, and do not achieve the objects of the present invention.

Specifically, Japanese Pat. application Publication No. 10655/1964 discloses fibrillating synthetic fibers in a swelling agent to obtain so-called hooked fibers having short, fine hooks. In such hooked fibers, however, the so-called hooks necessary for intertwining are short and are not self-adhesive, and therefore intertwining of fibers is not sufficient for the purpose and the paper that is obtained is non-uniform.

It is disclosed in Japanese Pat. application Publication No. 20757/1961 that gel-like, non-collapsed, wet spun acrylic fibers tend to become fibrillated.

However, fibrillation is carried out, as reported in said publication using gel-like, non-collapsed fibers. In order to convert fibrillated fibers into a sheet-like form, it is preferable that they should have hydrophilic properties, and self-adhesion, as well.

If fibrillated fibers should fail to exhibit selfadhesion, a sheet-like material having high tensile strength cannot be obtained, a special adhesive is required in order to obtain high tensile strength. A sheet as obtained in the abovementioned publication is, as described in the specification, very low in tensile strength, which clearly possesses the drawback that the fibrillated material fails to exhibit the property of self-adhesion.

Japanese Pat. application Publication No. 11851/1960 discloses a synthetic pulp fibril having feeler-like protrusions which are said to be capable of intertwining. As distinguished from the product obtained by ordinary spinning processes, and because this fibril essentially lacks any so-called stalk fibers, it has the drawback, when synthetic paper is made therefrom, that the paper product has poor physical properties, especially tenacity. Accordingly, this fibril, together with other fibrous materials, is effectively utilized as an adhesive but it has the disadvantage that good paper cannot be obtained from this fibril alone.

We, the present inventors have previously proposed, as referred to in our U.S. applications Ser. Nos. 180,875 and 435,453, fibers for paper and synthetic pulp consisting of (A) 15–90 percent by weight of a fiber-forming hydrophobic polymer and (B) 10–85 percent by weight of a copolymer in which a hydrophilic portion and a hydrophobic portion are bonded chemically, in which the hydrophilic portion is dispersed and oriented in the direction of the fiber axis.

However, we have conducted strenuous studies with a view to producing a fiber which is capable of yielding a pulp having even more excellent opacity and wet dimensional stability in respect of paper performance, high level dispersing properties in water and fibril adhering strength after forming the sheet, and we have now created a fiber which has the outstanding composition and structure of the present invention as a result.

An object of the present invention is to provide a method of making a fiber for a synthetic paper which is capable of yielding paper having high opacity, degree of whiteness and wet dimensional stability not attainable by paper made of conventional wood pulp.

Another object of the present invention is to provide a method of making a fiber for a synthetic paper imparted with performances capable of producing pulp and making paper by exactly the method normally used for wood pulp. This is done by imparting hydrophilic properties to pulp -- a point which has been little considered in the case of conventional synthetic pulp, improving the dispersion properties in water when made into an aqueous slurry, and imparting adhesion strength between the fibrils.

Still another object of the present invention is to provide a method for making a synthetic fiber which is capable of obtaining a beaten fibril (pulp) having excellent intertwinement and adhesion among the fibrils, which can be made into paper in a wet system, using ordinary beating means of the type normally used with natural pulp, and capable of using the resulting beaten fibril in making paper consisting of 100 percent of said beaten fibrils, or making paper consisting of beaten fibril and natural pulp in desired ratios.

These and other objects will further become apparent in the following specification, and in the claims.

DETAILED DESCRIPTION OF THE INVENTION

Figure 1:
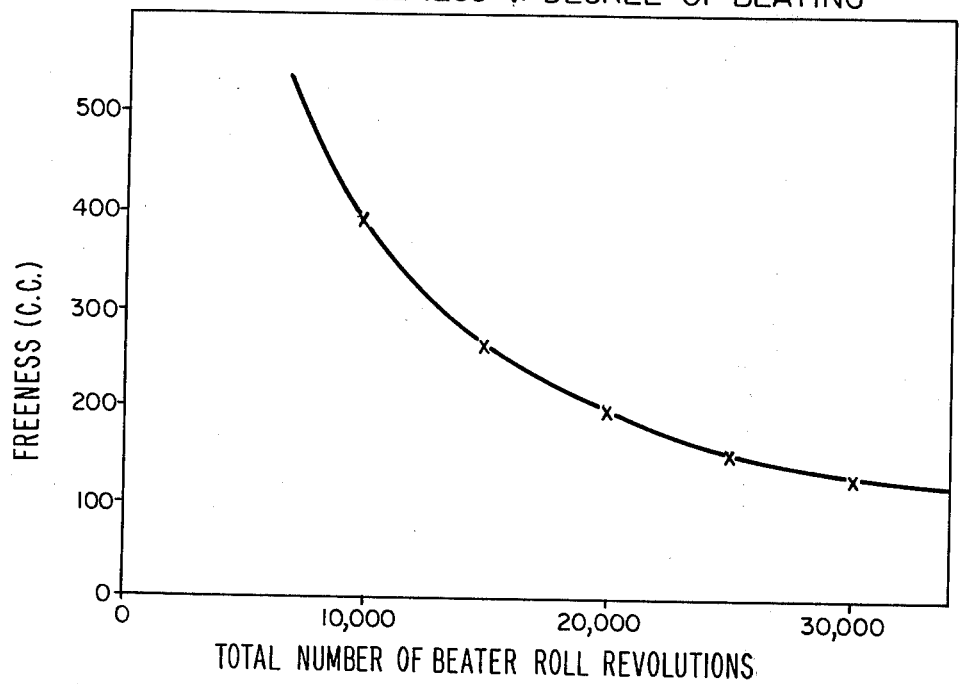

The aforesaid objects of the present invention are achieved by dissolving a composition substantially comprising (A) about 5–40 percent by weight of a graft copolymer consisting of (a) about 20–80 percent by weight of polyvinyl alcohol, and (b) substantially the balance acrylonitrile, and (B) about 60–95 percent by weight of a copolymer consisting of (c) about 55–95 percent by weight of styrene and (d) substantially the balance acrylonitrile in dimethyl sulfoxide or dimethyl acetamide, and wet-spinning the resulting solution into an aqueous spinning bath.

As a preferred embodiment of the present invention, there may be provided, in addition to components (A)

and (B), unreacted polyvinyl alcohol and acrylonitrile produced as byproducts in the process of graft copolymerization. Further, polymers of the polyvinyl alcohol series and the acrylic series may be added separately.

In the practice of the present invention, as a further preferred embodiment, the fiber may comprise a mixed polymer system containing about 5–40 percent by weight of a copolymer in which polyvinyl alcohol and acrylonitrile bond chemically, containing about 20–80 percent by weight of polyvinyl alcohol, and containing about 60–95 percent by weight of an acrylonitrile - styrene copolymer containing about 5–45 percent by weight of acrylonitrile, in which system polyvinyl alcohol is present in an amount of about 2–55 percent by weight based on the weight of the entire mixed polymer system.

A method which is desirable for obtaining a fiber having the characteristics of the present invention involves dissolving such polymer composition in dimethyl sulfoxide or dimethyl acetamide and wet-spinning the resulting solution into an aqueous coagulating bath. A method involving further drawing or heat-treating the spun fiber while it is a water-containing gel, as occasion demands, is desirable.

Because of of the application of such heat-treatment, the fiber may contract by more than 45 percent.

The present invention has succeeded in producing a paper which has remarkably high opacity and wet dimensional stability by using a graft copolymer consisting of polyvinyl alcohol (hereinafter referred to as PVA) having hydrophilic properties and acrylonitrile (hereinafter referred to as AN) to impart hydrophilic characteristics to the pulp. At the same time, it disperses the copolymer into a copolymer consisting of styrene (hereinafter referred to as St) and AN.

It is an indispensable requirement that the copolymer (A) should be a copolymer in which an AN component and a PVA component are chemically bonded to each other, so that the PVA component as a hydrophilic component and the AN component as a hydrophobic component exist in the form of, for example, a graft or block copolymer, and two different types of copolymer (A) and copolymer (B) are caused to exist in a mixed system, in the aforementioned ratios.

In the reaction for obtaining copolymer (A), a small amount of an AN polymer is produced which is not bonded to the hydrophilic component or the unreacted hydrophilic component, and is not bonded to AN. However, when the copolymers (A) and (B) exist within the aforesaid range, then without fail, the existence of such AN polymer or unreacted PVA does not become an obstacle in the practice of the present invention, insofar as its amount is within the aforesaid range. Therefore, the AN polymer need not be intentionally removed. What is important is that the AN component and the PVA component should chemically bond to each other within the aforesaid range and exist in chemically bonded combination, by which it is possible to impart excellent hydrophilic properties, dispersing properties in water and self-adhesion to the beaten fibrils (synthetic pulp) which are obtained by beating the fiber. When the AN component and the PVA component are simply mixed and exist, it is not possible to impart such characteristics to the beaten fibril.

When an An - PVA copolymer used in the practice of the present invention is a graft copolymer, it is possible to produce the same by aqueous non-uniform polymerization or solution uniform polymerization. Referring to the degree of polymerization of the PVA, it is preferably that the average degree of polymerization is within the range of about 500–3400, preferably within the range of 600–1800.

It is possible to carry out polymerization by dissolving such PVA in a polymerization solvent, for example, dimethyl sulfoxide (hereinafter referred to as DMSO), mixing with and dissolving in the resultant solution, 80–400 percent by weight (based on PVA) of AN or a vinyl monomer consisting mainly of AN, and polymerizing the resulting mixed solution using as a catalyst, for example, a persulfate at a relatively low temperature of from room temperature to about 70°C. By using such a method, a PVA/AN graft copolymer, unreacted PVA, polyacrylonitrile or a polymer of the AN series (hereinafter referred to as PAN) are produced.

It is also possible to add the same AN to an aqueous solution of PVA and carry out the polymerization reaction. The obtained PVA/AN graft copolymer can be isolated by reprecipitation and filtration.

It is necessary that the PVA content in the graft copolymer should be about 20–80 percent by weight, preferably about 35–65 percent by weight. In case said content is less than about 20 percent by weight, the molecular weight of the graft polyacrylonitrile component is too high, seriously harming processability and impeding the development of hydrophilic property. On the other hand, when said content exceeds about 80 percent by weight, when the graft copolymer is made into an aqueous slurry as fiber and pulp, the graft copolymer flows out in water and the objects of the present invention cannot be achieved.

A graft copolymer containing PVA having an average degree of polymerization of less than about 500 drops too much in water resistance and swelling strength, decreasing the water resistance of the paper obtained from the fiber, and not imparting preferred qualities to such paper.

On the other hand, when said average degree of polymerization exceeds about 3400, hydrophilic property decreases, fibrillation is not carried out smoothly and performance characteristics necessary for use as paper are not developed. Upon preparing the graft copolymer, besides AN, less than about 40 mol percent of a vinyl monomer other than AN, but which is copolymerizable with AN, (for example, vinyl acetate, methyl acrylate, styrene and vinyl chloride) may be copolymerized.

The St/AN copolymer, (component B) of the present invention may be prepared by ordinary methods of random copolymerization and known methods of block copolymerization such as aqueous non-uniform polymerization and bulk polymerization, for example.

In order to achieve high opacity and a high degree of whiteness, it is not preferable that the St/AN copolymer be compatible with the PVA/AN graft copolymer and the polymer of acrylic series. As one criterion for judging whether the former is compatible with the latter two, one may check the transparency of a solution obtained by dissolving the former and the latter two in a common solvent. For example, when a polymer of acrylic series and a PVA/AN graft copolymer are dissolved in DMSO, a somewhat transparent solution is formed. We have found that by adding a St/AN copolymer which is incompatible with both the PVA/AN graft copolymer and the polymer of acrylic series, paper having remarkably high opacity and degree of whiteness is obtained. To that end, it is necessary that the styrene content in the St/AN copolymer should be within the range of about 55–95 percent by weight, preferably about 60–85 percent by weight.

When the styrene content is less than about 55 percent by weight, however, a large amount of the St/AH copolymer may be added, and the compatibility with the other constitutional element increases. Therefore, the improvement of opacity and degree of whiteness is not satisfactory.

On the other hand, when the styrene content exceeds about 95 percent by weight, the solubility in DMSO and DMAc (dimethyl acetamide), which functions as solvents, is reduced and a satisfactory product cannot be obtained.

The composition of the present invention consists of about 5–40 percent by weight of such a PVA/AN graft copolymer and about 60–95 percent by weight of such a St/AN copolymer. When the amount of said graft copolymer is less than about 5 percent by weight, the fiber produced by the method of the present invention is not fibrillated by beating, and has essentially no hydrophilic property. When the amount of the graft copolymer exceeds about 40 percent by weight, the water resistance of the resulting paper grows worse. In addition, the opacity of the resulting paper is harmed. When the amount of the St/AN copolymer is less than about 60 percent by weight, the objective high opacity of the present invention cannot be achieved.

The composition used in the method of the present invention is not limited to those consisting of said two copolymers only, but it may contain the unreacted PVA and a polymer of the AN series produced as by-products in the process of graft copolymerization, and may include an intentionally added polymer of acrylic series.

Homopolyvinyl alcohol has the property that a greater part thereof falls off when it is formed into an aqueous slurry in the process of making fibers and pulp, which is not essential for achieving the object of the present invention. However, referring to the amount of PVA, this should not exceed about 23 percent by weight. When said amount exceeds about 23 percent by weight, the opacity of the paper is harmed. Further, this is not desirable in respect of foaming and contamination of the aqueous slurry.

The amount of the polymer of acrylic series should not exceed about 35 percent by weight. When higher, the desired high opacity cannot be achieved.

With respect to the polymer of acrylic series, a separately polymerized linear polymer may be used. One having a molecular weight of 20000 – 100000 is preferable. A monomer of the vinyl series in an amount within the range not exceeding about 40 mol percent which may be used as a copolymerization component for graft copolymerization, may be used as well.

Substitution for the St/AN copolymer by adding less than about 35 percent by weight of a polymer of acrylic series results in somewhat reduced opacity. However, by reinforcing the toughness of the beaten fibrils, it has the function of increasing the tenacity of paper. However, when it is substituted for the PVA/AN copolymer, there is no such effect.

The high opacity is measured by a method of measuring to be mentioned later, and should be in excess of at least about 80 percent. When less, there is no measurable effect of improvement with respect to a value of about 70 percent obtained by paper made from wood pulp.

As mentioned above, existence of the unreacted PVA has no essential significance in the present invention. However, when the amount of such unreacted PVA exceeds about 23 percent by weight, foaming takes place in the aqueous slurry due to bleed-out of the PVA at the time of beating, or the degree of opacity of the resulting paper is sharply lowered.

It is further preferable that in fibers constituted by these mixed polymers, PVA be contained in an amount of about 2–55 percent by weight based on the total amount of the polymers. Existence of PVA in this amount, including PVA which is chemically bonded, gives favorable dispersing properties in water. The shape of the fibrils obtained by beating the fiber is very effective for promoting intertwinement of fibrils and adhesion of paper made from such fibrils. But when this amount is less than about 2 percent by weight of PVA, development of such properties is insufficient. Using an amount exceeding about 55 percent by weight of PVA, the water resistance, opacity and degree of whiteness of the resulting paper are reduced.

A wet spinning method using a solvent - water coagulating bath is especially suitable for producing a synthetic fiber of the present invention. As solvents, dimethyl sulfoxide (DMSO) and dimethyl acetamide (DMAc) are suitable. When the solvent is used and a solvent - water coagulating bath is used in producing a fiber, the product is very suitable for beating and making paper. The spun undrawn yarn is drawn to a predetermined draw ratio by ordinary methods in steam, hot water or a solvent - water bath, and thereby becomes capable of attaining the tenacity and shape of fibrils that are suitable for forming paper.

As mentioned above, the composition of the present invention may be dissolved in DMSO or DMAc. Further, this solution may be wet spun by ordinary means into an aqueous spinning bath, for example, an aqueous solution of DMSO or DMAc containing up to the maximum of about 30% by weight of DMSO or DMAc to product an undrawn water-containing gel yarn. Further, such undrawn yarn may be drawn in a hot water bath, or in a steam atmosphere as occasion demands.

One specific method according to the practice of the present invention is dissolving such polymer composition in the aforesaid solvent at a concentration within the range of about 8–40 percent by weight based on the weight of said solvent.

In case the concentration is less than about 8% by weight, when the wet spun yarn is beaten, strong fibrils are unlikely to be present and the paper tends to be very brittle.

On the other hand, when the concentration exceeds about 40 percent by weight, the viscosity of the spinning solution is increased too much, harming spinnability. Spinning into an aqueous spinning bath increases the tendency of the fibrils to disperse in water when an aqueous slurry is formed in a later step. This is indispensable for forming a fiber having a structure which is suitable for producing a pulp that is capable of developing high opacity, which is one of the objects of the present invention. Both incompatibility of the graft copolymer (A) with the copolymer (B) and the formation of a coagulated composition upon being contacted with an aqueous medium derived from the hydrophobic property of the copolymer (B) work very favorably, and fibers of the present invention develop porous structures including microvoids which are roughly uniformly dispersed throughout the entire fiber structure.

This is one reason why the beaten pulp has very high opacity.

Only the micro-voids have the effect of increasing the opacity of the fibers. It is preferable that fibers of the present invention contain micro-voids, the average diameter of a greater part thereof not exceeding 5 microns, and that they be uniformly dispersed throughout the entire structure of the fibers.

For example, it is possible to make artificially an annular hollow yarn using a composition of the present invention. However, hollows having diameters of more than 5 microns brought about at such time do not contribute to opacity. However, when the organization of a substantial part of the structure is in accordance with the present invention, it is possible to achieve excellent results.

One of the factors which relate to the porous structures of fibers of the present invention is the apparent specific gravity (aa), which can be calculated from the average cross-sectional area of the substantial part of the fiber (S), and the average denier of the fiber (d).

Further, by heating fibers of the present invention to a temperature higher than the softening points of the polymers, it is possible to produce a transparent yarn having no voids in which the porous structure collapses. By measuring the specific gravity at this time, it is possible to obtain a specific gravity pd of the product in the densely compacted state. It is preferable that the structure of a fiber of the present invention be such that:

$$pa/pd < 0.8$$

When the ratio is greater than 0.8, increase of opacity cannot be expected.

Further, undrawn water-containing gel yarns obtained by wet spinning into an aqueous spinning bath are subsequently heat-treated at a wet temperature of 80°–180°C, or preferably drawn at such wet temperature.

We have found that when the composition of the present invention is drawn, a remarkable effect is observed. When each of a solvent solution of the graft copolymer (A) of the present invention alone and a solvent solution of the copolymer (B) of the present invention alone is drawn after being spun into a solvent/water coagulating bath, the best that can be obtained is continuous drawing of at most 2 times (in the case of the graft copolymer (A), drawing is completely impossible) is possible. However, when a solvent solution of a composition obtained by mixing the graft copolymer (A) and the copolymer (B) at a predetermined ratio in accordance with the present invention, and the resulting composition is drawn by the operations described in the present invention, it is possible to draw this composition to a ratio of at least 9, between draw rollers.

Drawing is carried out with wet heating, for example, in hot water containing the solvent, or in a steam atmosphere. So-called known wet heat drawing is applicable.

In this case, it is necessary for the temperature to be at least 80°C. Especially, when the amount of a component which is amorphous and dihydrophobic (such as styrene) is large, smooth drawing cannot be carried out at a temperature lower than 80°C. On the other hand, when the temperature exceeds 180°C, the St/AN copolymer melts and the monofilaments stick to each other. As a result, various obstacles are encountered when the fibrils separate and disperse by heating. The draw ratio is selected in connection with the desired beating conditions.

Further, the resulting fiber has a denier of about 0.1–30, and is cut into a length of about 1–50 mm, preferably 2.5–25 mm. In the resulting synthetic fiber, the copolymer (A) is dispersed as a plurality of particles in the copolymer (B) and arranged as independent phases in the direction of the fiber axis.

A fiber obtained by this production method is easily fibrillated by beating and may be made into pulp which has excellent dispersing properties in water. It is possible to make such fibers into an aqueous dispersion having a concentration of about 1–20 percent by weight and to beat the same by use of commercially available beating devices such as, for example, ball mills, beaters, PFI mills, and refiner. When, for example, a PFI mill is used, it is possible to use a linear pressure of 3.4 kg/cm$^2$, a clearance of 0.1–0.3 mm and a cut fiber concentration of 3–12 percent by weight and by varying the total number of rotation of the rolls, it is possible to obtain a slurry having a freeness of about 40–750 cc.

Normal wet paper making methods are applicable without change, and it is possible to mix this synthetic pulp with wood pulp in desired proportions and to make paper from the mixed pulp -- especially from wood pulp blended with about 10–35 percent of the synthetic pulp, and the effect of the present invention is remarkable.

Fibers obtained according to the present invention are easily fibrillated, forming a pulp having excellent dispersing properties in water. With reference to paper making, known wet paper making methods are applicable. As a result, it is possible to make paper having high levels of opacity, a high degree of whiteness and an excellent wet dimensional stability not attainable by conventional paper made from wood pulp.

It is preferable that a high draw ratio fiber produced by the method of the present invention be subjected to wet heat-treatment in boiling water, or in a steam atmosphere. It is preferable that the heat-treating temperature be about 80°–180°C, preferably about 90°–120°C. The time is preferably within the range of about 30 seconds to about 8 minutes, and it is to be expected that the final fiber will contract by at least about 45 percent of the initial length.

When a fiber whose shrinkage is less than about 45 percent, or a fibril obtained by subjecting a fiber to beating operations without prior treatment with wet heat, excessive fibrils are sometimes brought about from the fiber stalk, and the fibrils tend to cohere to form blocks. Therefore, the dispersing properties in water deteriorate and, as a result, the texture of paper tends to become inferior.

The wet heat-treatment can be carried out, before the fiber is cut, as a continuous yarn, and after the fiber contracts, it may be cut into a length of about 1–15 mm, preferably about 7–15 mm, and then the cut fiber may be beaten.

A low draw ratio yarn of the present invention (such as a draw ratio between 1.0 and 2.5, for example) may be beaten without being subjected to such wet heat-treatment to produce a pulp having excellent dispersing properties.

A fiber produced by the method of the present invention need not have uniform denier throughout the direction of the fiber length. In spinning according to the present invention, the solution of said composition may be jetted at a high speed into the coagulating bath and may be discharged into a coagulating bath flowing at high speed.

The composition of a PVA/AN graft copolymer used in the method of the present invention may be determined in a given case by the following means. From the polymer solution after graft copolymerization, it is possible to extract the polymer as a solid component by known methods, such as re-precipitation operations and filtering operations. After the solid component is dried, it operations subjected to hot water extracton for 48 hours using a Soxhlet extractor. One component extracted by such operaions is the unreacted PVA polymer. Subsequently, after the solid component is dried again, it is extracted with dimethyl formamide (hereinafter referred to as DMF) at 100°C for 5 hours, and the extracted component is a polymer of the AN series.

The remaining component is a PVA/AN graft copolymer. From the amount charged, the amount of the re-precipitated polymer, the amount of product extracted with hot water, and the amount of product extracted with DMF, the compositions of the graft PVA and graft PAN in the graft copolymer are determined.

With reference to an AN/St copolymer, by measuring the amount of nitrogen (N) by elemental analysis, the amount of the AN component is determined, and from the remaining amount, the amount of the ST component is determined.

The degree of opacity and the degree of whiteness of paper referred to, are measured as follows. Using an integral sphere-type HTR meter, manufactured by Japan Precision Optical Co., Ltd. and using a green filter, when the reflexibility obtained when a standard white plate is placed at the back of a sheet of paper having a basis weight of 40 g/m$^2$ is made 100, the degree of opacity is expressed by a reflexibility (%) when a black plate is placed at the back of said paper; and using a blue filter, in case a reflexibility of a standard MgO plate is made 100, the reflexibility (%) when at least 6 sheets of the sample paper are accumulated is read and made a degree of whiteness.

In order to discriminate dispersing properties in water, when a very small amount of pulp is put into a test tube together with water and shaken, said properties are thereafter easily determined by observing whether or not flocks due to coherence of the fibrils are produced. However, when extreme fibrils are produced, this may have a bad influence upon the spinning, remarkably prolonging the dehydrating time when the diluted slurry is dehydrated from above the mesh. Therefore, discrimination is possible in this respect. As a most simple method, paper may be made and the uniformity of the texture of the paper may be determined.

A beaten fibril (synthetic pulp) obtained by beating the resulting fiber may be formed into paper consisting of substantially 100 percent of said beaten fibril and into paper consisting of a mixture of said beaten fibril and wood pulp at an optional mixing ratio. The resulting paper is characterized in that the degree of whiteness, degree of opacity, wet dimensional stability, permeation resistance, surface picking stength and printability are simultaneously attainable at balanced high levels which have not been realizable by conventional natural pulp. The paper can develop excellent aptitute in many uses for paper such as paper for reprography like coated paper, photographic paper, India bible paper, thin paper, tracing paper, electrostatic recording paper, electrophotographic paper, magnetic recording paper and copying paper, and paper used in combination with these papers for reprography or independently like pressure sensitive copying paper, card for a statistic machine, punch tape, business form, optical mark recognition paper and optical character recognition paper as well as magnetic ink character recognition paper, release paper, paper board and wrapping paper.

Hereinbelow, specific examples of the present invention are presented in order to clarify the disclosure of the present invention. The examples shown hereinbelow are illustrated in conjunction with drawings for clarifying the fundamental requirements for showing the constitution of the present invention and these examples are not intended to limit the scope of the present invention.

Figure 2:
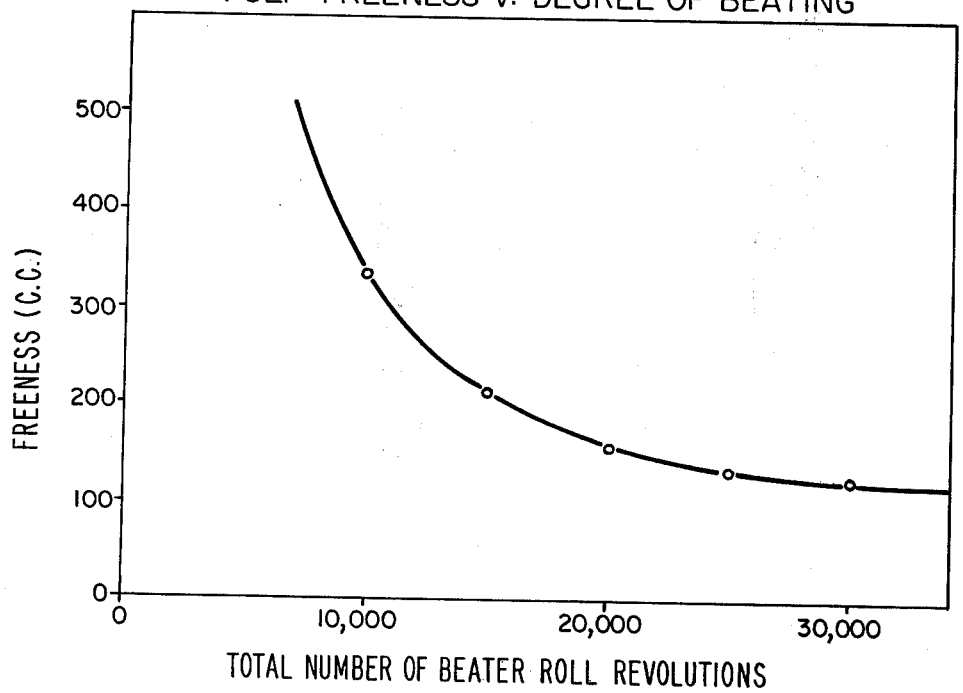

Of the Drawings:

FIG. 1 is a graph showing the relationship between pulp freeness and degree of beating, using a yarn prepared in accordance with Example 1 herein, and FIG. 2 is a graph showing a similar relationship for the pulp obtained in the procedure of Example 2 hereof.

EXAMPLE 1

1 kg of PVA having a degree of polymerization of 1400 (NM-14, manufactured by Nihon Gosei Kagaku Co. Ltd.) was dissolved in 19 liters of DMSO at a temperature of 50°–60°C for about 2 hours with stirring to obtain a uniform solution. To this solution were added ammonium persulfate (hereinafter referred to as APS) in an amount of 0.1 mol percent based on AN as a catalyst and dodecyl mercaptan (hereinafter referred to as DM) in an amount of 2 percent by weight based on An as a molecular weight control agent, and the APS and DM were uniformly dissolved in said solution with sufficient stirring. A mixture of 3 kg of AN and 0.2 kg of DMSO was added dropwise to this solution which was kept at a temperature of 52°C. This solution was polymerized with stirring for about 2 hours to obtain a polymer solution having a viscosity of 200 poise.

When this condition was attained, hydroquinone in an amount of 0.1 mol percent based on AN was added to the polymer solution, and the mixture was stirred sufficiently to stop the polymerization reaction. In the polymer, the AN conversion was 61 percent, the extraction ratio with hot water was 16 percent the PVA content was 35 percent and the extraction ratio with dimethyl formamide (DMF) was 7.5 percent. From these values, it was determined that PVA bonded to AN to form a graft copolymer. In the polymer obtained, the component which was soluble in hot water was PVA not bonded to AN and the component soluble in DMF was polyacrylonitrile (hereinafter referred to as PAN) not bonded to PVA. However, these components did not have to be purified and removed, but could be used per se as a polymer solution. And when it was necessary for any reason, it was possible to take out the graft copolymer by precipitation and dissolving and extracting operations, and to use the graft copolymer. The PVA used herein was not particularly limited, however, when a judgment was made from the viewpoint of the mechanical properties of the obtained fiber, the adhesion and dispersing properties in water of the fibril after being beaten, a degree of polymerization within the range of 500–3400 was found to be preferable.

In a separately prepared polymerization vessel, 20 parts of an AN/St (24/76) mixture were added to 150 parts of water. To the resulting mixture were added, with vigorous stirring, tertiary dodecyl mercaptan (TDM) in an amount of 0.2 percent based on the monomer, a catalyst of the azobis series in an amount of 0.3 percent based on the monomer and a small amount of sulfuric acid, and polymerization was carried out at a temperature of 80°–100°C for about 3 hours to obtain a beads-like AS (acrylonitrile - styrene) copolymer (AN/St = 24.76). The degree of polymerization of this copolymer expressed as intrinsic viscosity (a) measured in methylethyl ketone (hereinafter referred to as MEK) at 30°C was 0.5. The resulting beads-like AS copolymer was dried by a flush dryer to remove the moisture completely. Next, this copolymer was dissolved in DMSO at 70°C with stirring to obtain a uniform polymer solution having a concentration of 27.

Next, proper amounts of a DMSO solution of the aforesaid PVA - AN graft copolymer and a DMSO solution of the AS copolymer were taken, respectively. Further, a necessary amount of DMSO was added to prepare a mixed polymer solution having a concentration of 13 percent containing 12 percent of the PVA component.

This mixed polymer solution was stirred by a spiral-type stirring blade for 3 hours to obtain a mechanically uniform mixed solution, which was spun as a spinning solution through spinning nozzles each having a diameter of 0.1 mm into a DMSO/water (70/30) coagulating bath, and the resulting undrawn yarn was continuously drawn. After drawing, the drawn yarn was washed with water sufficiently to remove the solvent. The denier of the resulting yarn was 5.

This yarn had the following values:

$\rho a = 0.41$, $\rho d = 1.11$ and $\rho a/\rho d = 0.37$.

The PVA portion of this yarn was dyed with $OsO_4$ (osmic acid) and when an ultra thin (cross-sectonal) cut piece was taken and observed under an electron microscope, it was observed that a plurality of voids having an average diameter of less than 5 microns were uniformly dispersed in the cross-section and the copolymer (A) was dispersed in the copolymer (B) as the dispersed phase. By the same token, by observation of a longitudinal section of the fiber also, it was observed that the component (A) was dispersed in the component (E) as striae.

This yarn was cut into a fiber length of 3 mm and the cut pieces were beaten in a PFI mill manufactured by Kumagaya Riki Co., Ltd., Japan (clearance 0.2 mm, weight 3.4 kg and pulp concentration 5 percent) to carry out fibrillation. FIG. 1 of the drawings shows the effect of such beating on pulp freeness, by showing the relation between the number of revolution of the PFI mill and the freeness. It is clearly observed from FIG. 1 that a fiber based on the present invention forms paper-forming fibrils by beating.

Beaten fibrils whose freeness values were 200 cc, 320 cc, and 390 cc were made into aqueous solutions having concentrations of 0.02 percent, and were introduced into a manual paper-making sheet machine (using 80 mesh metal screen) manufactured by Kumagaya Riki Co., Ltd., Japan to obtain three different manually made papers (wet papers). The basis weights of these wet papers were 40.1 g/m². The wet papers were dried by an FC dryer manufactured by FC Seisakusho Co., Ltd., at 105°C for 2 minutes.

In Table 1, measured results of various characteristics of the three kinds of papers (samples A, B and C) as well as paper made from wood pulp are shown. Of these characteristics, as conspicuous characteristics, it is apparent that a high degree of whiteness, opacity, wet strength and excellent degree of air permeation, which we have been unable to attain with conventional wood pulp, are developed despite the absence of any addition of any filler or additive in the case of the three papers prepared according to the present invention.

Table 1

| | | | Physical Properties of Paper | | | | |
|---|---|---|---|---|---|---|---|
| | Degree of whiteness (%) | Degree of opacity (%) | Breaking length (km) | Elongation (%) | Wet Breaking length (km) | Dry shrinkage (%) | Air permeating degree (sec) |
| Paper made from wood pulp | 79 | 67 | 3.7 | 4.3 | 0.1 | 2.3 | 5 |
| Sample A | 97 | 97 | 2.5 | 3.1 | 2.0 | 2.1 | 120 |
| Sample B | 96 | 95 | 3.1 | 3.0 | 2.5 | 2.3 | 95 |
| Sample C | 97 | 96 | 3.0 | 3.2 | 2.4 | 2.2 | 55 |

Note:
1) Paper made from wood pulp: NBKP/LBKP = 40/60 blend, freeness 320 cc, basis weight 40 g/m².
   Sample A: Paper made from beaten pulp having a freeness of 200 cc.
   Sample B: Paper made from beaten pulp having a freeness of 320 cc.
   Sample C: Paper made from beaten pulp having a freeness of 390 cc.
2) Wet strength: Breaking length (Km) after the sample was immersed in water at 20°C for 30 minutes.
3) Dry shrinkage: Shrinkage in a diagonal line when wet paper was dried at 105°C for 2 minutes by an FC drum dryer.
4) Air permeating degree: Number of seconds measured by a Densometer manufactured by Kumagaya Riki Co., Ltd., Japan.
5) Degree of whiteness and degree of opacity were measured by an integral sphere-type HTR meter manufactured by Nihon Seimitsu Kogaku Co., Ltd.

The degree of opacity was expressed as reflexibility when a black plate was placed at the back of sample paper. The standard was the reflexibility obtained by placing a standard white plate at the back of the sample paper, using a green filter, and was designated as 100.

The degree of whiteness was expressed as reflexibility when at least 6 samples were accumulated, when as a standard the reflexibility of a standard MgO plate using a blue filter was designated as 100.

EXAMPLE 2

1. 61 g of PVA having a degree of polymerization of 1800 were dissolved in 550 g of DMSO at 50°C for 2 hours with stirring to prepare a uniform solution. To this solution was added 0.61 g of DM and the mixture was stirred. To the resulting solution, a mixed solution of 61 g of AN and 61 g of DMSO was added dropwise. When necessary, the degree of acidity of the system was controlled. Next, to the solution, 0.5 g of APS was added dropwise and polymerization was carried out at 50°C for 6 hours. Thereafter, 0.57 g of hydroxylamine sulfate was added as a polymerization stopper together with a small amount of DMSO to the system to complete the polymerization. The polymer solution so obtained, having a graft copolymer, had 100 grams of the entire polymer, 80 grams of the graft copolymer of 80 g, a solution concentration of 12.4 percent and a viscosity of 250 poise.

2. By suspension polymerization the same as in Example 1, an AS (AN/St = 25/75) copolymer having an intrinsic viscosity (n) measured in MEK at 30°C of 0.65 was prepared, which was dissolved in DMSO at 50°C to prepare a uniform polymer solution having a concentration of 25 percent.

3. The polymer solution obtained in (1) and the polymer solution obtained in (2) and a measured necessary amount of DMSO were mixed to prepare a polymer solution having a concentration of the entire polymers of 19 percent and a PVA content of 13 percent, and the resulting polymer solution was stirred at 50°C for 2 hours to prepare a uniformly dispersed mixed polymer solution, which was made a spinning solution.

This spinning solution was spun from spinning nozzles each having a diameter of 0.15 mm into a DMSO/water = (40/60) coagulating bath at 30°C, and the undrawn yarn was drawn to 4.5 times in hot water and washed with water to remove the remaining solvent.

The denier of the resulting yarn was 4. This yarn had values of:

$$\rho a = 0.40, \rho d = 1.10, \text{ and } \rho a/\rho d = 0.36.$$

This yarn was cut into fiber lengths of 3 mm, and the cut pieces were beaten in a PFI mill manufactured by Kumagaya Riki Co., Ltd., Japan (clearance 0.2 mm, weight 3.4 kg, pulp concentration 5 percent) to carry out fibrillation. FIG. 2 shows various stages of thoroughness of beating as variation of degree of freeness (C.S.F.) as well as the total number of revolutions of the PFI mill. From FIG. 2, it is apparent that beating of the fiber proceeds and fibrils are formed by the beating treatment.

This fiber was made into 3 different beaten fibrils having freeness values of 400 cc, 300 cc and 200 cc by the PFI mill. Each of these beaten fibrils was further beaten by a home mixer (SM-225, pulp concentration 2 percent, manufactured by Sanyo Denki Co., Ltd., Japan) into pulp having a freeness of 305 cc (pulp A), 215 cc (pulp B), and 95 cc (pulp C).

These pulps A, B and C were caused to have pulp concentrations of 0.2 percent and were made manually into papers using a manual paper-making sheet machine (using 80 mesh metal screen) manufactured by Kumagaya Riki Co., Ltd., Japan. The basis weights of these papers were 50 g/m² and 35 g/m². The wet papers were dried in an FC dryer (at 105°C for 2 minutes). In Table 2, the measured results of various characteristics of these papers are shown. As conspicuous, remarkable characteristics, a remarkably high degree of whiteness, a degree of opacity and a wet strength which we had been unable to realize with conventional wood pulp were obtained. The shrinkage at the time of drying the wet papers was low to about the same degree as paper made from wood pulp, and their air permeating degree was high.

Next, an examination was made of the characteristics of paper made from mixtures of said synthetic pulps of the present invention and wood pulp. As such wood pulp, needle-leaved tree-refined kraft pulp (NBKP) and a broad-leaved tree-refined kraft pulp (LBKP) were beaten by a PFI mill (clearance 0.2 mm, weight 3.4 kg, concentration 5 percent) to obtain beaten pulps having a freeness of 310 cc. This NBKP and LBKP were mixed at a ratio of N/L = 4/6 and the obtained mixture was made base pulp of wood pulp. This mixed base pulp and each of said beaten pulp A and pulp B were mixed, the resultant 2 kinds of mixed pulps were caused to have concentrations of 0.02 percent, from which papers were manually made. The wet papers were dried at 105°C for 2 minutes by an FC dryer. Table 3 shows the results, from which it is understood that papers obtained from mixtures obtained by mixing lower amounts of pulps obtained by beating a fiber shown in the present invention (beaten fibrils) with said base pulp of wood pulp exhibit a high degree of whiteness, degree of opacity, wet strength, breaking length and surface strength which have heretofore been unattainable with paper made from 100% wood pulp. It was able to develop well balanced paper characteristics, exceeding the properties of natural pulp.

Table 2

| Sample | Basis weight (g/m²) | Degree of whiteness (%) | Physical Properties of Paper Degree of Opacity (%) | Air Permeating Degree (sec) | Breaking length (km) | Elongation (%) | Wet Breaking Length (km) | Dry Shrinkage (%) |
| --- | --- | --- | --- | --- | --- | --- | --- | --- |
| Paper made from pulp A | 50 | 97 | 97 | 73 | 3.0 | 2.7 | 2.1 | 2.2 |
| Paper made from pulp B | 50 | 96 | 95 | 151 | 2.5 | 2.8 | 1.7 | 2.5 |
| Paper made from pulp C | 50 | 97 | 97 | 215 | 2.1 | 3.5 | 1.4 | 2.1 |
| Paper made from pulp A | 33 | 94 | 92 | 50 | 2.7 | 3.1 | 1.7 | 2.1 |
| Paper made from pulp B | 35 | 93 | 93 | 100 | 2.5 | 3.2 | 1.6 | 2.3 |
| Paper made from pulp C | 35 | 93 | 94 | 135 | 2.6 | 3.0 | 1.5 | 2.0 |
| Paper made from wood | 50 | 80 | 68 | 10 | 3.6 | 4.3 | 0.1 | 2.1 |

Table 2-continued

| Sample | Basis weight (g/m²) | Degree of whiteness (%) | Physical Properties of Paper | | | | | |
|---|---|---|---|---|---|---|---|---|
| | | | Degree of Opacity (%) | Air Permeating Degree (sec) | Breaking length (km) | Elongation (%) | Wet Breaking Length (km) | Dry Shrinkage (%) |
| pulp | | | | | | | | |

Note:
1) Wood pulp: blending ratio LBKP/NBKP = 3/1, freeness 300 cc.
2) Methods of measuring the characteristics were same as those of Table 1.

Table 3

| Sample | Mixing Ratio (Wood Pulp %) | Physical Properties of Mixed Papers | | | | | | | | |
|---|---|---|---|---|---|---|---|---|---|---|
| | | Dehydration Time (sec.) | Bulk Density (g/cm²) | Breaking Length (km) | Elongation (%) | Degree of Whiteness (%) | Degree of opacity (%) | Air Permeating Degree (sec.) | Folding Endurance time (1 kg load) | Surface Pick-Strength |
| Paper made from wood pulp | 100 | 4.0 | 0.72 | 4.5 | 3.9 | 71 | 70 | 42 | 120 | 11A |
| Paper made from Pulp A and Wood Pulp | 90 | 4.2 | 0.70 | 4.7 | 4.3 | 85 | 85 | 51 | 136 | 12A |
| | 80 | 4.4 | 0.67 | 5.5 | 4.3 | 88 | 90 | 62 | 155 | 13A |
| | 70 | 4.6 | 0.65 | 5.3 | 4.1 | 90 | 92 | 68 | 145 | 14A |
| | 50 | 5.0 | 0.65 | 4.8 | 4.1 | 91 | 93 | 72 | 121 | 11A |
| Paper made from Pulp B and Wood pulp | 90 | 4.2 | 0.70 | 4.9 | 4.2 | 86 | 83 | 53 | 137 | 12A |
| | 80 | 4.3 | 0.68 | 5.6 | 4.3 | 89 | 89 | 61 | 160 | 14A |
| | 70 | 4.7 | 0.65 | 5.4 | 4.0 | 92 | 91 | 73 | 151 | 14A |
| | 50 | 4.9 | 0.66 | 4.9 | 4.1 | 93 | 95 | 81 | 130 | 12A |

EXAMPLE 3

A PVA - AN graft copolymer as in Example 2 and an AS copolymer ($[n] = 0.65$, AN/St = 28/72) were dissolved in DMSO and spinning solutions having concentrations of 15 percent by weight containing PVA's in amounts of 10 percent by weight and 20 percent by weight based on the entire amounts of the polymers were prepared.

On the other hand, PVA (NM-14, manufactured by Nihon Gosei Kagaku Co., Ltd.), PAN (molecular weight 63000) and an AS copolymer ($[n] = 0.65$, AN/St = 28/72) were so prepared that they became the same as the PVA, PAN and AS components of the aforesaid graft copolymer and AS copolymer.

These four different spinning solutions were spun from spinning nozzles each having a diameter of 0.1 mm into a solvent - water congulating bath (DMSO/water = 45/55) and continuously drawn to 3.5 times in a hot water bath. After drawing, the remaining solvent was removed by washing with water.

The denier of the resulting yarns was 3.5. These yarns were cut into lengths of 3 mm, and the cut pieces were beaten by a PFI mill the same as in Example 2. The degrees of beating are shown in Table 4. In the cases of fibers in which the PVA - AN graft copolymers were used, beating proceeded smoothly and forming of fibrils was carried out. In contrast, fibers consisting of simple mixtures of the respective components were very difficult to beat and breakage of fiber and bleeding out of PVA took place at the time of beating and beating as such was not desirable.

Next, these beaten fibrils were made into four different wet papers by a manual paper making instrument manufactured by Kumagaya Riki Co., Ltd., Japan, dried at 105°C for 2 minutes by an FC dryer and the characteristics of the dry papers were measured. The results are shown in Table 5. The fibers consisting of simple mixtures of the respective components cannot obtain required paper strength and bulk density as paper and did not become paper that was capable of withstanding actual use. In constrast, the fibers consisting of the graft copolymers and the AS copolymers developed excellent paper-forming performances as will readily be understood from Table 5.

Table 4

| Sample | Amenability to Beating | |
|---|---|---|
| | PVA content % | Beating |
| Fiber from PVA/AN graft copolymer and AS copolymer | 10 | Beating was smooth, formation of fibrils proceeded. |
| '' | 20 | Beating was very smooth, formation of fibrils proceeded. |
| Fiber from simple mixture of PVA, PAN and AS copolymer | 10 | Very difficult to beat, many fibers remained unbeaten, breakage occurred and PVA bled out. |
| '' | 20 | '' |

Table 5

| Sample | PVA Content (%) | Physical Properties of Paper | | | | | |
|---|---|---|---|---|---|---|---|
| | | Bulk Density (g/cm²) | Breaking length (km) | Elongation (%) | Degree of whiteness (%) | Degree of opacity (%) | Folding Endurance time (1 kg Load) |
| Fiber from | | | | | | | |

Table 5-continued

| Sample | PVA Content (%) | Bulk Density (g/cm²) | Physical Properties of Paper | | | | Folding Endurance time (1 kg Load) |
| --- | --- | --- | --- | --- | --- | --- | --- |
| | | | Breaking length (km) | Elongation (%) | Degree of whiteness (%) | Degree of opacity (%) | |
| simple mixture of PVA, PAN and AS copolymer | 10 | 0.48 | 0.5 | 2.0 | 87 | 80 | 0 |
| " | 20 | 0.50 | 0.6 | 2.1 | 86 | 74 | 1 |
| Fiber from mixture of PVA/AN graft copolymer and AS copolymer | 10 | 0.69 | 3.9 | 4.2 | 95 | 96 | 80 |
| " | 20 | 0.71 | 4.1 | 4.3 | 98 | 94 | 80 |

EXAMPLE 4

By the same method as in Example 2, a PVA - AN graft copolymer was obtained by DMSO solution polymerization. The solution as precipitated using methanol as a precipitating agent to obtain a solid PVA - AN graft copolymer, which was treated by vacuum drying for 24 hours to remove the methanol and a very small amount of the solvent. Next, this copolymer was dissolved in DMAc at 60°C to prepare a uniform solution having a concentration of 15 percent. Separately, an AS copolymer ([n] = 0.51, AN/St = 23/77) was dissolved in DMAc at 80°C to prepare a uniform solution having a concentration of 15 percent. The aforesaid two kinds of solutions were mixed to prepare spinning solutions containing 10, 25, 40, 60 percent of PVA. Each of these spinning solutions was spun from a spinning nozzle each having a diameter of 0.11 mm into a solvent - water (DMAc/water = 60/40) coagulating bath, and continuously washed with steam. The denier of the resulting yarn was 4. This yarn was cut into fiber lengths of 3 mm, the cut pieces were beaten in a PFI mill and further beaten by a home mixer to obtain a beaten fibril having a freeness (C.S.F.) of 250 cc, which was made into an aqueous dispersed liquid having a concentration of 0.02 percent, from which manually made wet paper having a basis weight of 50 g/m² was made, which was dried at 102°C for 15 minutes by a drum dryer to obtain paper. The results of measuring the characteristics of these four kinds of paper are shown in Table 6.

It is confirmed that each of these four kinds of paper was excellent in degree of whiteness, degree of opacity, air permeating degree and tenacity and well balanced as a whole, which was not true of paper made from wood pulp. And it should be understood that when the PVA content reached 60 percent, the balance of paper quality was lost.

EXAMPLE 5

1.125 kg of PVA (NM-14, manufactured by Nihon Gosei Kagaku Co., Ltd.) was dissolved little by little at 50°C in 10 kg of DMSO. Next, 9.68 g of APS, 11.25 g of DM and a small amount of sulfuric acid were added to the resulting DMSO solution, the ph of the mixture was adjusted to 4.5, and to this mixture, a solution obtained by dissolving 1.125 kg of AN in 2.75 kg of DMSO was added dropwise for 50 minutes. The mixed solution was stirred for 7 hours while the temperature was kept at 50°C. Thereafter, 14 g of hydroxylamine sulfate and 4 g of $H_2SO_4$ were added to stop the reaction. As a result, a solution having a viscosity at 50°C of about 300 poises and a polymer concentration of 12.4 percent by weight were obtained. The polymer obtained by reprecipitating this solution in methanol consisted of 11.7 percent by weight of PVA, 3.8 percent by weight of PAN and 84.5 percent by weight of PVA-/AN graft copolymer containing 60.1 percent by weight of PVA. This solution was designated (A).

Next, 150 parts of water were placed in a separate polymerization vessel and while the temperature was kept at 85°C, DM in an amount of 0.3 percent by weight based on a monomer and N,N'-azobisisobutyronitrile in an amount of 0.35 percent based on the monomer were added. Next, 30 parts of an AN/St = 24/76 (by weight monomer and a small amount of a surface active agent were added to the mixture, and the solution was stirred for 2 hours to obtain a beads-like resin (B) having an intrinsic viscosity (n) measured in MEK at 30°C of 0.5 and a degree of polymerization of 98.5 percent.

121 parts of the solution (A), 85 parts of the resin (B) and 183 parts of DMSO were mixed at 60°C for 3 hours to obtain an opaque polymer solution having a polymer concentration of 25.0 percent. This solution was spun into an aqueous solution at 30°C containing 57 percent by weight of DMSO and the resulting undrawn yarn was drawn in hot water at 95°C. The draw Table 6

| No. | PVA content (%) | Bulk density (g/cm²) | Physical Properties of Paper | | | | Air permeating degree (sec.) |
| --- | --- | --- | --- | --- | --- | --- | --- |
| | | | Breaking length (km) | Elongation (%) | Degree of whiteness (%) | Degree of opacity (%) | |
| 1 | 10 | 0.69 | 4.1 | 3.1 | 97 | 96 | 75 |
| 2 | 25 | 0.69 | 4.2 | 3.5 | 98 | 97 | 75 |
| 3 | 40 | 0.71 | 4.5 | 4.0 | 95 | 92 | 60 |
| 4 | 60 | 0.72 | 4.5 | 4.0 | 75 | 65 | 5 | ratios and deniers per filament of the resulting yarns are shown in Table 7. These yarns were cut into lengths of 3–10 mm and introduced into boiling water for wet heat-treatment for predetermined periods. After this, the heat-treated fibers were made into aqueous slurries having concentrations of 5 percent by weight, and these slurries were beaten in a PFI mill (load 3.4 kg/cm$^2$, clearance 0.2 mm) after 30000 revolution of the rotor. Thereafter, the concentrations of the slurries were adjusted to 1 percent (by weight), 800 cc of each of the beaten fibers were thrown into a home mixer, stirred and disaggregated to obtain pulp slurries. The results appear in Table 7.

screen for making paper to make papers having basis weights of 40 g/m$^2$.

The wood pulp used was NBKP/LBKP = 50/50 (weight ratio) having a freeness of 413 cc. The papermaking characteristics and paper properties are shown in Table 8.

Table 8

| Sample No. | Synthetic pulp/ wood pulp | Dehydrating time (sec) | Paper texture | Degree of Opacity (%) | Degree of whiteness (%) |
| --- | --- | --- | --- | --- | --- |
| 1 | 20/80 | 6.1 | Uniform | 83 | 87 |
| 2 | 20/80 | 6.1 | Uniform | 86 | 89 |
| 3 | 20/80 | 5.9 | Uniform | 83 | 87 |
| 3 | 35/65 | 7.2 | Uniform | 96 | 93 |
| 4 | 20/80 | 6.8 | Uniform | 83 | 87 |
| 5 | 20/80 | 5.9 | Uniform | 84 | 87 |
| 6 | 0/100 | 5.7 | Uniform | 67 | 81 |

Table 7

| Sample No. | Draw ratio | Denier (d) | Cut length (mm) | ρa/ρd | Boiling water treating time (min) | Shrinkage (%) | Dispersing properties in water of pulp slurry |
| --- | --- | --- | --- | --- | --- | --- | --- |
| 1 | 3.2 | 4.4 | 10 | 0.52 | 1.5 | 66 | Uniform dispersion |
| 2 | 4.0 | 3.1 | 10 | 0.50 | 1.5 | 64 | Uniform dispersion |
| 3 | 4.5 | 2.3 | 15 | 0.54 | 3.0 | 72 | Uniform dispersion |
| 4 | 4.5 | 2.8 | 10 | 0.49 | 0.5 | 61 | Uniform dispersion |
| 5 | 5.0 | 2.5 | 10 | 0.51 | 1.0 | 66 | Uniform dispersion |

EXAMPLE 6

The pulp slurries obtained in Example 5 were formed into papers by a square-type manual papermaking sheet machine manufactured by Kumagaya Riki Co., Ltd., Japan, while observing the standard operations described in JIS P-8209.

Pulp slurries having papermaking concentrations of 0.02 percent by weight were used, 12 liters of the liquids were formed into papers by a 80 mesh metal spun.

EXAMPLE 7

By the same method as in Example 5, various compositions of PVA/AN graft copolymers and AN/St copolymers were prepared as shown in Table 9. These copolymers were prepared by the same method as in Example 1, formed into spinning solutions and wet spun.

The draw ratio was 4.5, the denier was 3 and the boiling water treatment time was 1.5 minutes, the beating conditions were made the same as in Example 1 and the papermaking conditions were the same as in Example 6. The results are shown in Table 9.

From Table 9, it is clear that only the compositions according to the present invention gave good results.

Table 9

| | Yarn Composition | | | | | | | | Paper Making Characteristics | | | | |
| --- | --- | --- | --- | --- | --- | --- | --- | --- | --- | --- | --- | --- | --- |
| | PVA/AN Graft Copolymer | | St/AN Copolymer | | PVA Entire Amount (%) | Polymer of the AN Series Entire Amount (%) | Shrinkage (%) | calcd | Dispersing Properties in Water | Synthetic Pulp/ Wood Pulp | Dehydration Time (sec.) | Degree of Whiteness (%) | Degree of opacity (%) | Breaking length (km) |
| Sample No. | PVA Content (%) | Entire Amount (%) | St Content (%) | Entire Amount (%) | | | | | | | | | | |
| 7 | 60.1 | 3.5 | 76 | 96.5 | 0 | 0 | 66 | 0.47 | not fibrillated | — | — | — | — | — |
| 8 | 60.1 | 2.5 | 76 | 70.4 | 3.5 | 1.1 | 32 | 0.50 | Uniform | 20/80 | 7.2 | 84 | 92 | 6.2 |
| 9 | 60.1 | 4.3 | 76 | 49.1 | 6.0 | 1.9 | 47 | 0.87 | Uniform | 20/80 | 8.5 | 77 | 71 | 6.5 |
| 10 | 46 | 2.2 | 65 | 70.4 | 2.4 | 5.2 | 69 | 0.51 | Uniform | 20/80 | 6.1 | 84 | 85 | 6.5 |
| 11 | 60.1 | 12.6 | 83 | 85.8 | 1.8 | 0.6 | 77 | 0.53 | Uniform | 20/80 | 5.9 | 90 | 94 | 5.9 |
| 12 | 72 | 32 | 96 | 68 | 0 | 0 | could not collect yarn | | | — | — | — | — | — |
| 13 | 72 | 17 | 44 | 83 | 0 | 0 | 68 | 0.85 | Uniform | 20/80 | 6.8 | 79 | 73 | 6.1 |
| 14 | 72 | 35 | 76 | 65 | 0 | 0 | 60 | 0.53 | Uniform | 20/80 | 8.8 | 86 | 91 | 6.7 |
| 6 | — | — | — | — | — | — | — | — | — | 0/100 | 5.7 | 81 | 67 | 8.5 |

EXAMPLE 8

AN was solution polymerized in DMSO using N,N'-azobisisobutyronitrile as a catalyst to prepare a DMSO solution containing 15.4 percent by weight of PAN having a molecular weight of 67000.

Compositions having various compositions were prepared from the resulting polymer solution and a PVA/AN graft copolymer prepared by the same method as in Example 5 to carry out the similar determinations to those of Example 7. The results are shown in Table 10. In Table 10, it is shown that only the compositions according to the present invention gave good results.

prepare a solution having a concentration of 20 percent by weight, which was spun into a DMAc/water = 50/50 solution at 40°C and the resulting undrawn yarn was drawn 4.2 times in hot water at 95°C to obtain a 2.8 d continuous yarn. This yarn was cut into a length of 6 mm. Thereafter, sample cut pieces were put on a belt conveyer and passed through a steam treating machine capable of blowing off steam from the lower nozzles for a length of 2 m from the entrance through the exit at a speed of 1 m/min. The temperature inside said machine was 95°C.

This wet heat-treatment caused the yarn to contract by 71 percent.

Table 10

| Sample No. | PVA/AN Craft Copolymer | | St/AN Copolymer | | PVA Entire Amount (%) | Polymer of the AN Series (%) | Shrinkage (%) | Dispersing properties in Water | Synthetic Pulp/Wood Pulp | Paper Making Characteristics | | |
|---|---|---|---|---|---|---|---|---|---|---|---|---|
| | PVA Content (%) | Entire Amount (%) | St Content (%) | Entire Amount (%) | | | | | | Dehydration Time (sec.) | Degree of opacity (%) | Breaking length (km) |
| 15 | 52 | 21 | 76 | 65 | 3.0 | 11 | 61 | Uniform | 20/80 | 9.2 | 84 | 7.0 |
| 16 | 52 | 15 | 76 | 65 | 2 | 18 | 58 | Uniform | 20/80 | 9.4 | 83 | 8.6 |
| 17 | 52 | 9 | 76 | 63 | 1 | 25 | 57 | Uniform | 20/80 | 9.6 | 83 | 6.1 |
| 18 | 52 | 10 | 76 | 75 | 1 | 13 | 60 | Uniform | 20/80 | 8.8 | 91 | 5.8 |
| 19 | 52 | 15 | 76 | 45 | 2 | 38 | 58 | Uniform | 20/80 | 10.5 | 72 | 6.7 |

EXAMPLE 9

18 g of PVA (NH-26, manufactured by Nihon Gosei Kagaku Co., Ltd.) were dissolved in 300 ml of water at 50°C. To the resulting aqueous solution were added 0.45 g of APS and 0.49 g of sodium thiosulfate, both dissolved in 5 ml of water. To the resulting solution, 80 g of AN was added dropwise and the mixture was polymerized for 1.5 hours. After the polymerization, a saturated aqueous solution of sodium sulfate was added to the polymer solution, and the resulting mixed solution was heated to 100°C to aggregate the polymer particles, which was cooled and filtered. Next, the filtered polymer was washed with hot water and thereafter washed with methanol and dried to obtain 97 g of the polymer. The composition of this polymer consisted of 43 g of PAN and 57 percent of a PVA/AN graft copolymer containing 28 percent by weight of PVA.

To 100 parts of this polymer was added 250 parts of an St/AN copolymer containing 70 percent of St separately polymerized by the same method as in Example 5. The resulting mixture was dissolved in DMAc to The resulting yarn was subjected to beating in a PFI mill using the method shown in Example 6. The total number of the roll revolution was varied and various beaten pulps were prepared. As a reference, yarn not treated with steam was similarly processed.

By the method shown in Example 7, the dehydration time of mixed (synthetic pulp/wood pulp = 20/80) pulps was measured and the results are shown in Table 11.

Table II

| Sample No. | Sample | Total number of rotation of rotor | Freeness (cc) | Dispersing properties in water | Dehydration time (sec.) |
|---|---|---|---|---|---|
| 20 | Steam treated for 2 min. | 20,000 | 320 | Uniform | 6.2 |
| 21 | Steam treated for 2 min. | 30,000 | 265 | Uniform | 6.5 |
| 22 | Steam treated for 2 min. | 40,000 | 220 | Uniform | 6.9 |

EXAMPLE 10

Fibers according to the method of the present invention obtained in examples up to Example 8 were beaten, and the resulting beaten fibrils (synthetic pulps) were mixed with wood pulp. From the resulting mixtures paper products were made. The wet strength and dimensional stability of these papers were measured and the results are shown in Table 12. The wet dimensional stability was shown by change of dimension (%) when the relative humidity (RH) was varied from 65 percent to 95 percent at 20°C using a TAPPI paper elasticity tester.

Wet strength was shown by the ratio (%) of the tensile strength of a sample immersed in water at 20°C for 20 minutes obtained by a tensile test carried out immediately thereafter to the tensile strength of the same sample which was dry. The values of paper made from 100 percent wood pulp are also shown in Table 12.

Table 12

| Sample No. | Synthetic pulp/ wood pulp | Wet strength (%) | Wet dimensional stability (%) |
|---|---|---|---|
| 2 | 20/80 | 18 | 0.57 |
| 3 | 35/65 | 21 | 0.41 |
| 11 | 20/80 | 14 | 0.52 |
| 6 | 0/100 | 1.4 | 1.51 |

EXAMPLE 11

10 kg of PVA (NM-14, manufactured by Nihon Gosei Kagaku Co., Ltd.) was dissolved little by little in 10 kg of DMSO at 50°C. To the DMSO solution, 9.1 g of ASP, 2.1 g of DM and a small amount of sulfuric acid were added, the pH of the solution was adjusted to 4.5, and a solution obtained by dissolving 2.1 kg of AN in 2.5 kg of DMSO was added dropwise to the same solution for 50 minutes. While the temperature was kept at 50°C, the solution was stirred for 8.5 hours, and then 6.4 g of hydroxylamine sulfate and 7 g of $H_2SO_4$ were added thereto to stop the reaction. As a result, a polymer solution having a viscosity of about 175 poises at 50°C and a polymer concentration of 14.5 percent by weight was obtained. A polymer obtained by reprecipitating this polymer solution in methanol consisted of 11.9 percent by weight of unreacted PVA, 3.7 percent by weight of polyacrylonitrile and 79.4 percent by weight of a PVA/AN graft copolymer containing 50.1 percent by weight of PVA. This polymer solution was designated (A).

Next, 150 parts of water were introduced into a different polymerization vessel, and while the temperature was kept at 80°C, DM in an amount of 0.3 percent by weight based on a monomer and N,N'-azobisisobutyronitrile in an amount of 0.35 percent based on the monomer were added to said water. Next, 30 parts of an An/St = 24/76 (weight ratio) monomer and a small amount of a surface active agent were added to the resulting aqueous solution, and by continuing stirring of the solution for 2 hours, a beads-like resin (B) having a degree of polymerization of 98.5 percent and an intrinsic viscosity [n] measured in MEK at 30°C for 0.5 was obtained.

In still another polymerization vessel, by using N,N'-azobisisobutyronitrile as a catalyst in DMSO, an AN/methyl acrylate = 93/7 (molar ratio) mixture was polymerized to obtain a DMSO solution (C) having a polymer concentration of 20.8 percent by weight. The molecular weight of above said acrylic polymer was 67000.

207 parts of the solution (A), 60 parts of the resin (B) and 48 parts of the solution (C) were mixed together with constant amounts of DMSO to prepare solutions having different polymer concentrations.

Each of these solutions was spun into an aqueous solution containing 52 percent by weight of DMSO, the resulting undrawn yarn was drawn under various drawing conditions and washed with water, the results being shown in Table 13.

Table 13 shows the results obtained by making papers from beaten pulps obtained by cutting the wet drawn yarns into a length of 6 mm adding 400 g of such cut pieces in a state of aqueous slurry having a concentration of 1 percent by weight into a home mixer (SM-226, 1200 cc, manufactured by Sanyo Denki Co., Ltd., Japan) and rotating such aqueous slurry at about 10,000 r.p.m. for 30 minutes.

The papers were made using a square-type sheet machine manufactured by Kumagaya Riki Co., Ltd., Japan, while observing the standard operations described in JIS P-8209. The basis weights of the papers were 50 g/m². As a reference, paper from wood pulp (NBKP/LBKP = 50/50 (weight ratio)) was made from a slurry having a freeness of 413 cc under the same conditions. The results appear in Table 13.

Table 13

| | Spinning Conditions | | | | | Paper Making Characteristics | | |
|---|---|---|---|---|---|---|---|---|
| Sample No. | Concentration of Spinning Solution (%) | Drawing Medium | Drawing Temperature (°C) | Draw Ratio | Denier (d) | Degree of Fibrillation | Breaking length (km) | Degree of Whiteness (%) | Degree of opacity (%) |
| 23 | 25 | Hot water | 98 | 4.0 | 3.0 | fine fibril | 4.4 | 95 | 97 |
| 24 | 25 | Hot water | 98 | 3.0 | 3.5 | fine fibril | 3.7 | 94 | 96 |
| 25 | 25 | Hot water | 70 | 3.0 | could not be drawn | — | — | — | — |
| 26 | 22 | Steam | 100 | 4.5 | 2.5 | fine fibril | 3.5 | 95 | 96 |
| 27 | 22 | Steam | 140 | 4.5 | 2.5 | fine fibril | 3.8 | 95 | 95 |
| 28 | 18 | Steam | 100 | 3.5 | 2.0 | fine fibril | 3.5 | 94 | 96 |
| 29 | 7 | Hot water | 98 | 3.5 | 3.0 | not fibrillated | <1.0 | — | — |
| 30 | Paper made from 100% wood pulp | | | | | | 6.2 | 81 | 71 |

EXAMPLE 12

By the same methods as in Example 11, various PVA/AN graft copolymers, St/AN copolymers and polymers of the AN series were prepared and various fibers of compositions shown in Table 14 were spun.

DMSO solutions having polymer concentrations of 25 percent by weight were spun into an aqueous solution containing 70 percent by weight of DMSO at 30°C, and the resulting undrawn yarns were drawn 4.0 times in hot water at 98°C to obtain 3.0 d yarns.

The wet drawn yarns were cut into lengths of 3 mm, the cut pieces as aqueous slurries having concentrations of 5 percent by weight were beaten using a PFI mill manufactured by Kumagaya Riki Co., Ltd., Japan, at linear pressure of 3.4 kg/cm², clearance of 0.2 mm and rotor revolution number of 30,000. Thereafter, they were treated with a home mixer by the method of Example 11 for 8 minutes and made into paper sheets.

The paper sheets were made in the same way as in Example 11 to obtain samples made from 100 percent synthetic pulps having basis weights of 50 g/m². The results are shown in Table 14. Table 14 shows that only the compositions of the present invention gave good opacity.

varied from 65 to 95 percent at 20°C using a TAPPI paper elasticity tester.

The wet strength is shown as the ratio of the tensile strength of a sample immersed in water at 20°C for 20 minutes and is obtained by comparison of a tensile test carried out immediately thereafter to the tensile strength of the same sample when it was dry. The same measured results on paper made from 100 percent Table 14

| | Fiber composition | | | | | | | Yarn and paper characteristics | | | |
|---|---|---|---|---|---|---|---|---|---|---|---|
| | PVA/AN Graft Copolymer | | St/AN Copolymer | | Polymer of the AN Series | PVA | | | | | |
| Sample No. | PVA Content (%) | Entire Amount (%) | Styrene Content (%) | Entire Amount (%) | Entire Amount (%) | Entire Amount (%) | calcd | Fibril Characteristics | Breaking length (km) | Degree of Whiteness (%) | Degree of opacity (%) |
| 31 | — | 0 | 76 | 80 | 20 | 0 | 0.37 | Fibril floated and paper could not be made | | | |
| 32 | 62 | 7 | 76 | 87 | 5 | 1 | 0.40 | Minute fibril | 3.2 | 96 | 98 |
| 33 | 62 | 15 | 76 | 80 | 3 | 2 | 0.38 | Minute fibril | 4.1 | 95 | 97 |
| 34 | 32 | 45 | 76 | 44 | 4 | 7 | 0.92 | Minute fibril | 5.2 | 80 | 75 |
| 35 | 62 | 15 | 62 | 80 | 3 | 2 | 0.42 | Minute fibril | 4.0 | 91 | 95 |
| 36 | 62 | 18 | 48 | 75 | 4 | 3 | 0.82 | Minute fibril | 4.3 | 80 | 77 |
| 16 | 62 | 15 | 80 | 20 | 63 | 2 | 0.93 | Minute fibril | 5.1 | 76 | 72 |
| 17 | 62 | 20 | 0 | 0 | 77 | 3 | 0.98 | Minute fibril | 5.4 | 65 | 68 |
| 18 | 72 | 10 | 0 | 0 | 89 | 1 | 1.03 | Minute fibril | 4.7 | 61 | 64 |

EXAMPLE 13

18 g of PVA (NH-18, manufactured by Nihon Gosei Kagaku Co., Ltd.) were dissolved in 300 ml of water at 50°C. To the resulting aqueous solution, 0.45 g of APS and 0.49 g of sodium thiosulfate, both dissolved in 5 ml of water, were added. To the resulting solution, 65 g of AN were added dropwise and the solution was polymerized for 2.0 hours. A saturated aqueous solution of sodium sulfate was added to the polymer solution, the entirety was heated to 100°C to aggregate the polymer particles, and the polymer was cooled and filtered. Next, the polymer was washed with hot water and then with methanol and cooled to obtain 87 g of the polymer. The composition of this polymer consisted of 35 percent by weight of PAN and 65 percent by weight of a PVA/AN graft copolymer containing 26.5 percent by weight of PVA.

To 100 parts of this polymer, 270 parts of an St/AN copolymer containing 76 percent of styrene copolymerized by the same method as in Example 11 dissolved in DMAc was added, and the mixture was formed into a solution having a concentration of 20 percent by weight, which was spun into a mixed DMAc/water = 50/50 solution at 60°C, the resulting undrawn yarn was drawn 4.0 times in hot water at 95°C to obtain a 2 denier drawn yarn. The $\rho a/\rho d$ of this yarn was 0.39.

This yarn was cut into a length of 4 mm, beaten and formed into paper by the same means and method as in Example 11 to obtain paper having a basis weight of 50 g/m², a length at break of 3.9 km, a degree of whiteness of 94 percent and a degree of opacity of 97 percent.

EXAMPLE 14

The wet strength and wet dimensional stability of the paper made from the beaten fibers according to the method of the present invention obtained in examples up to Example 13 were measured and the results are shown in Table 15.

The wet dimensional stability is shown as the change of dimension (%) when the relative humidity (RH) was wood pulp are shown in Table 15.

Table 15

| Sample No. | Synthetic paper or wood paper | Wet strength (%) | Wet dimensional stability (%) |
|---|---|---|---|
| 23 | Synthetic paper | 50 | 0.3 |
| 32 | Synthetic paper | 57 | 0.1 |
| 34 | Synthetic paper | 12 | 1.4 |
| 35 | Synthetic paper | 48 | 0.2 |
| 30 | Wood pulp paper | 1.4 | 1.5 |

Accordingly, it will be appreciated that the synthetic fibers according to this invention "consist essentially of"

A. about 5–40 percent by weight of a graft copolymer consisting of
  a. about 20–80 percent of weight of polyvinyl alcohol, and
  b. about 80–20 percent by weight of acrylonitrile, and
B. about 60–95 percent by weight of a copolymer consisting of
  c. about 55–95 percent by weight of styrene, and
  d. about 5–45 percent by weight of acrylonitrile.

It will be appreciated from the foregoing disclosure that the use of this expression does not imply that these components must be free of any other additives. Indeed, natural pulp, homo polyvinyl alcohol, acrylic polymers, and many other additives may also be present, as disclosed herein, without interfering with the advantages and beneficial properties that are attained, and without departing from the spirit and scope of the invention as defined in the appended claims.

What is claimed is:

1. A method for producing a synthetic fiber capable of being fibrillated for forming paper, which comprises dissolving a composition consisting essentially of:
A. about 5–40 percent by weight of a graft copolymer consisting of
  a. about 20–80 percent by weight of polyvinyl alcohol having an average degree of polymerization of about 500–3400 chemically bonded to b. about 80–20 percent by weight of acrylonitrile, and B. about 60–95 percent by weight of a copolymer consisting of c. about 55–95 percent by weight of styrene, and d. about 5–45 percent by weight of acrylonitrile at a concentration of about 8–40 percent by weight, based upon the weight of the solvent, in a solvent selected from the group consisting of dimethyl sulfoxide and dimethyl acetamide, and wet spinning the resulting solution into an aqueous spinning bath.

2. A method according to claim 1 wherein the product of spinning is drawn in a manner to produce a drawn yarn and the resulting drawn yarn is contracted by subjecting it to wet heat-treatment.

3. The method according to claim 1 wherein polyvinyl alcohol and acrylonitrile are present in the solution.

4. The method according to claim 1 wherein the resulting wet spun fiber is heat treated at about 80°–180°C.

5. The method according to claim 4 wherein the heat-treated fiber is cut into a length of about 1–15 mm, and the cut fibers are beaten.

* * * * *